United States Patent
Ge

(10) Patent No.: US 8,565,777 B2
(45) Date of Patent: Oct. 22, 2013

(54) HANDS-FREE SYSTEM AND VEHICLE HAVING SAME AND MOBILE TELEPHONE INTEGRATED WITH SAME

(75) Inventor: Chi-Sheng Ge, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/339,191

(22) Filed: Dec. 28, 2011

(65) Prior Publication Data

US 2012/0172047 A1 Jul. 5, 2012

(30) Foreign Application Priority Data

Dec. 31, 2010 (TW) .............................. 99147173 A

(51) Int. Cl.
*H04W 72/00* (2009.01)

(52) U.S. Cl.
USPC ................. 455/450; 455/575.9; 455/569.1; 455/569.2

(58) Field of Classification Search
USPC .................... 455/450, 575.9, 569.1, 569.2
See application file for complete search history.

(56) References Cited

U.S. PATENT DOCUMENTS

| | | | |
|---|---|---|---|
| 7,206,615 B2 * | 4/2007 | Ochi et al. | 455/569.2 |
| 7,406,340 B2 * | 7/2008 | Juengling et al. | 455/569.2 |
| 7,813,771 B2 * | 10/2010 | Escott | 455/569.2 |
| 8,126,514 B2 * | 2/2012 | Azuma | 455/569.2 |
| 8,200,291 B2 * | 6/2012 | Steinmetz et al. | 455/569.2 |
| 8,244,307 B1 * | 8/2012 | Tilgner et al. | 455/569.1 |
| 8,270,933 B2 * | 9/2012 | Riemer et al. | 455/345 |
| 8,301,108 B2 * | 10/2012 | Naboulsi | 455/345 |
| 2002/0032048 A1 * | 3/2002 | Kitao et al. | 455/569 |
| 2003/0032460 A1 * | 2/2003 | Cannon et al. | 455/569 |
| 2005/0143141 A1 * | 6/2005 | Ochi et al. | 455/569.2 |
| 2005/0153758 A1 * | 7/2005 | Broussard et al. | 455/575.9 |
| 2005/0202852 A1 * | 9/2005 | Wada | 455/569.1 |
| 2005/0221878 A1 * | 10/2005 | Van Bosch et al. | 455/575.9 |
| 2005/0239479 A1 * | 10/2005 | Bednasz | 455/456.1 |
| 2006/0178169 A1 * | 8/2006 | Dunn et al. | 455/569.2 |
| 2011/0153118 A1 * | 6/2011 | Lim et al. | 701/2 |
| 2011/0295458 A1 * | 12/2011 | Halsey-Fenderson | 701/29 |
| 2012/0122525 A1 * | 5/2012 | Miller et al. | 455/569.2 |

* cited by examiner

*Primary Examiner* — Charles Shedrick
(74) *Attorney, Agent, or Firm* — Altis & Wispro Law Group, Inc.

(57) ABSTRACT

A system for enabling the hands-free use of a mobile telephone in a vehicle includes a processing circuit, a short-range communication unit and a microcontroller unit. The processing circuit calculates positional coordinates of the system. The short-range communication unit connects with the mobile telephones and receives positional coordinates of all nearby mobile telephones. The microcontroller unit receives the positional coordinates of the system and the mobile telephones, determines which mobile telephone is located in a defined position of the vehicle, and creates a wireless connection with the mobile telephone.

10 Claims, 4 Drawing Sheets

HANDS-FREE SYSTEM AND VEHICLE HAVING SAME AND MOBILE TELEPHONE INTEGRATED WITH SAME

BACKGROUND

1. Technical Field

The present disclosure relates to hands-free devices, and a hands-free system for a vehicle.

2. Description of Related Art

A vehicle is usually equipped with a hands-free system. The hands-free system allows a driver to use the telephone hands-free when driving the vehicle.

Many telephones are manually connected to a hands-free system. However, in the case of when the driver of a vehicle switches, as in a long journey, the telephone of the driver also needs to be changed. The telephone of the previous driver must be manually disconnected from the hands-free system first, then the telephone of the next driver must be manually connected to the hands-free system. Thus, the hands-free system is not always convenient.

What is needed, therefore, is a more user-friendly hands-free system that can overcome the aforementioned problems.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the various views.

DETAILED DESCRIPTION

Reference will be made to the drawings to describe exemplary embodiments of the present disclosure in detail.

Figure 1:
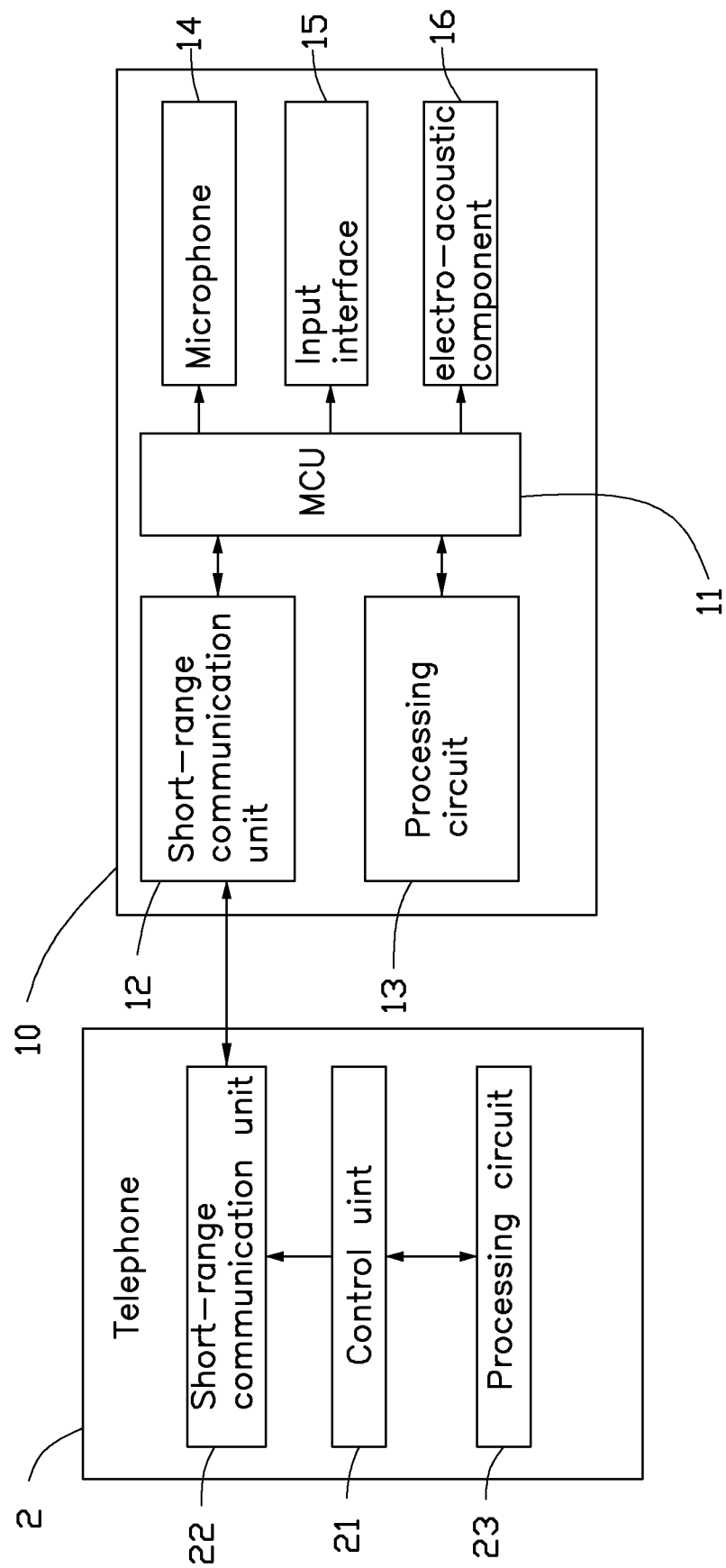
FIG. 1 is a block diagram of one embodiment of a hands-free system and a telephone integrated with the hands-free system.

FIG. 1 is a block diagram of one embodiment of a hands-free system 10 and a mobile telephone 2 integrated with the hands-free system 10. The hands-free system 10 may be positioned in a vehicle 100 (shown in FIG. 2). The hardware of the hands-free system 10 may be disposed beside the seat of the driver of the vehicle 100 and may provide operating keys and/or display information.

The mobile telephone 2 automatically searches for the hands-free system 10, and when a hands-free system 10 has been discovered by the mobile telephone 2, a wireless connection for data transfers between the mobile telephone 2 and the hands-free system 10 is established. The mobile telephone 2 sends positional coordinates of the mobile telephone 2 to the hands-free system 10. The hands-free system 10 receives the positional coordinates from the mobile telephone 2, analyses the positional coordinates of the mobile telephone 2 in relation to the positional coordinates of the hands-free system 10, and determines whether the mobile telephone 2 inside the vehicle 100 is located at a defined position of the vehicle 100.

The defined position may be a certain recognized position inside the vehicle 100 in relation to the hands-free system 10, or within a range of where the driving seat is placed, or any other recognizable position pre-set by a user as needed. If the mobile telephone 2 is determined to be located at the defined position, the hands-free system 10 establishes a wireless connection for data transfers with the mobile telephone 2, and the mobile telephone 2 automatically turns on a hands-free function of the mobile telephone 2. If the mobile telephone 2 is determined not to be located at the defined position, the hands-free system 10 will remain in standby mode, and the hands-free function of the mobile telephone 2 will remain off.

In one embodiment, the mobile telephone 2 may include a control unit 21, a short-range communication unit 22 and a processing circuit 23. The processing circuit 23 is connected to the short-range communication unit 22 via the control unit 21. The control unit 21 controls data transfers between the short-range communication unit 22 and the processing circuit 23, and further controls data transfers between the short-range communication unit 22 and the hands-free system 10. The short-range communication unit 22 automatically searches for the hands-free system 10, and when the short-range communication unit 22 has discovered the hands-free system 10, a wireless connection for data transfers between the mobile telephone 2 and the hands-free system 10 is established by the short-range communication unit 22. The processing circuit 23 reads the positional coordinates of the mobile telephone 2, and outputs the positional coordinates to the hands-free system 10 under the control of the control unit 21. The short-range communication unit 22 may be, for example, a BLUETOOTH module. The processing circuit 23 may include, for example, a global positioning system (GPS) receiver.

A number of software programs are stored in the short-range communication unit 22 or in a storage device (not shown) available to the short-range communication unit 22, or appropriate hardware components are integrated into the short-range communication unit 22, or firmware may be installed in the short-range communication unit 22, such that the short-range communication unit 22 searches for the hands-free system 10 automatically and connects automatically to the hands-free system 10 when found.

The hands-free system 10 includes a short-range communication unit 12, a processing circuit 13, a microcontroller unit (MCU) 11, a microphone 14, an input interface 15 and an electro-acoustic component 16. The MCU 11 is electrically connected to the short-range communication unit 12, the processing circuit 13, the microphone 14, the input interface 15, and the electro-acoustic component 16. The short-range communication unit 12 is coupled to the short-range communication unit 22 when the telephone 2 finds the hands-free system 10. The processing circuit 13 reads the positional coordinates of the hands-free system 10, and outputs the positional coordinates to the MCU 11. The microphone 14 may receive the sound of a person's voice, attempting to make a call or speaking during a call. The input interface 15 receives a user input signal, such as a call being made. The electro-acoustic component 16 outputs a second voice signal from a caller. The MCU 11 controls the short-range communication unit 12, the processing circuit 13, the microphone 14, the input interface 15 and the electro-acoustic component 16. Further, the MCU 11 receives the positional coordinates of the mobile telephone 2 and determines whether or not the mobile telephone 2 is located at the defined position based on the positional coordinates of the mobile telephone 2 and the hands-free system 10. The short-range communication unit 12 may be, for example, a BLUETOOTH module. The processing circuit 13 may include, for example, a global positioning system (GPS) receiver.

In detail, when the MCU 11 receives the positional coordinates of the mobile telephone 2 via the short-range communication unit 12 and the positional coordinates of the hands-free system 10 from the processing circuit 13, the MCU 11 determines whether the mobile telephone 2 is located at the defined position, by comparing the positional coordinates of the mobile telephone 2 with the positional coordinates of the hands-free system 10. When the MCU 11 determines that the mobile telephone 2 is located at the defined position in relation to the hands-free system 10, the MCU 11 controls the short-range communication unit 12 to establish a wireless connection for data transfers with the short-range communication unit 22, and the hands-free function of the mobile telephone 2 is then turned on. In addition, when the MCU 11 determines that the mobile telephone 2 is taken away from the defined position to any other position in the vehicle 100, the MCU 11 breaks the wireless connection with the short-range communication unit 22, and the hands-free function of the mobile telephone 2 is then turned off.

Figure 2:
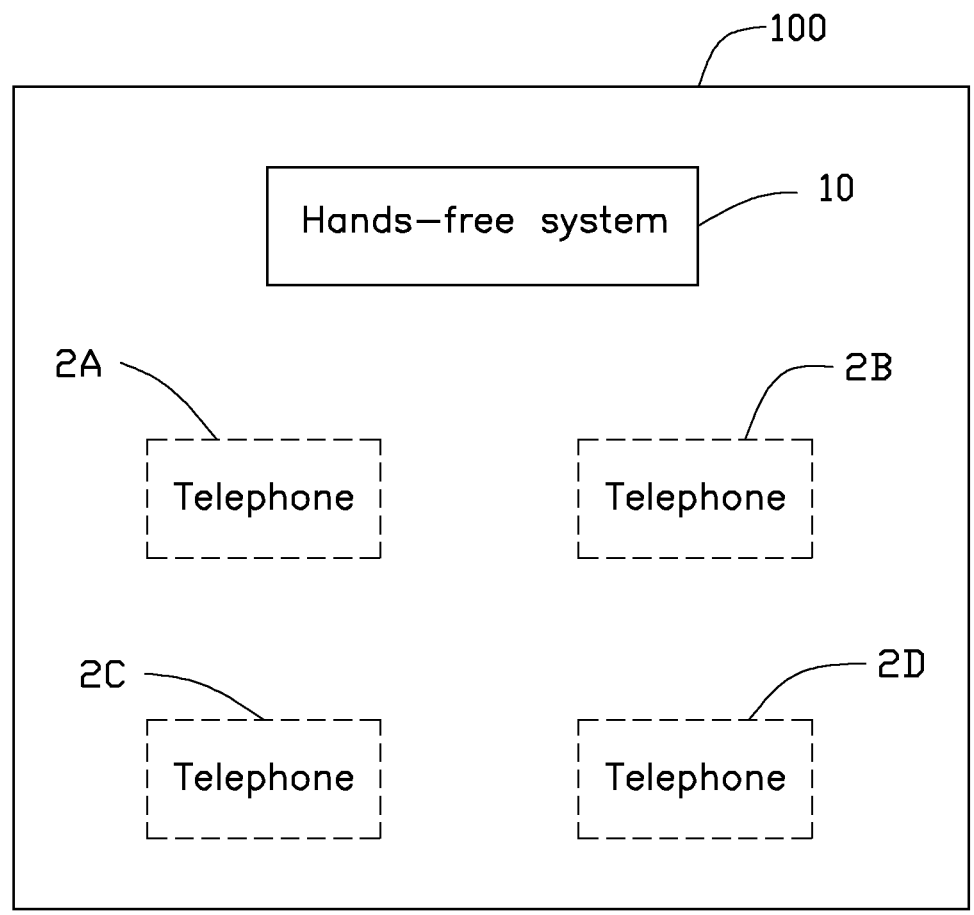
FIG. 2 is a block diagram of the positional relationship between four telephones and the hands-free system of FIG. 1 in a vehicle, the four telephones including a telephone 2A, a telephone 2B, a telephone 2C and a telephone 2D.

A vehicle 100 may be carrying four persons each having a mobile telephone, thus mobile telephones 2A, 2B, 2C and 2D are shown in FIG. 2. The driving seat is the defined position in this example. Except for their respective positions in the vehicle 100, the mobile telephones 2A, 2B, 2C and 2D are the same as the mobile telephone 2. The driving seat of the vehicle 100 may be located on the front left of the vehicle 100. It is understood that the driving seat of the vehicle 100 may also be located on the front right of the vehicle 100, which does not depart from the scope of this disclosure. Operation of the hands-free system 10 is as follows.

Figure 3:
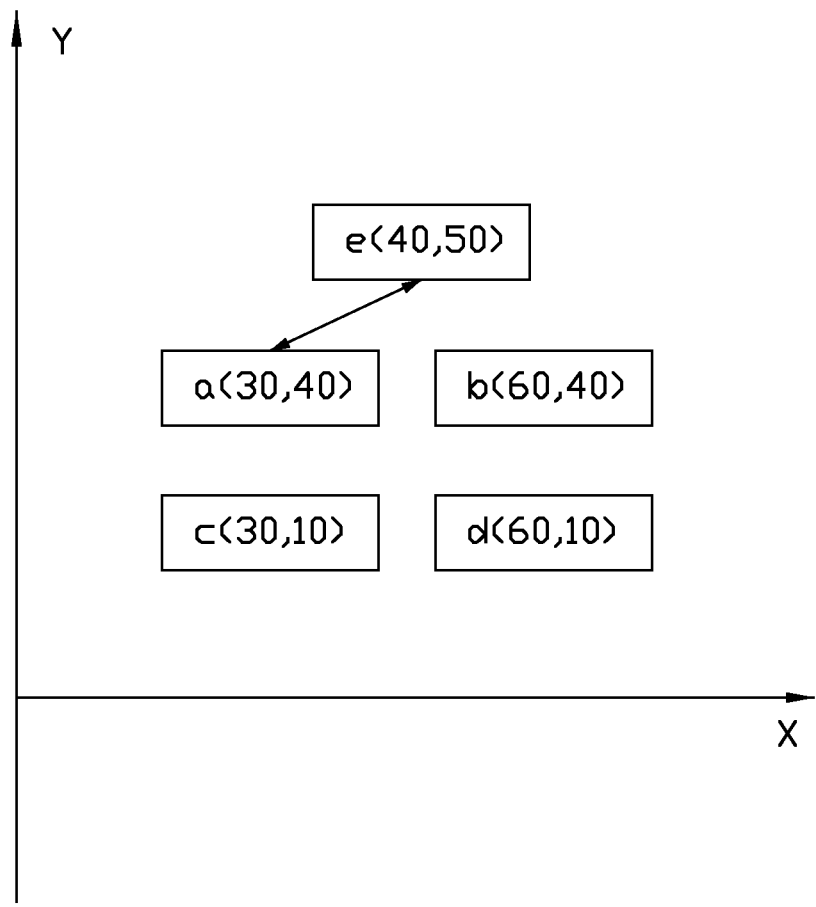
FIG. 3 is a view of the positional coordinates of the four telephones 2A, 2B, 2C and 2D and the hands-free system of FIG. 2.

FIG. 2 is a diagram of the positional relationship of the four mobile telephones 2A, 2B, 2C and 2D and the hands-free system 10 in the vehicle 100. The person who has the mobile telephone 2A is seated in the driving seat and drives the vehicle 100. The other three persons are passengers. FIG. 3 shows the positional coordinates of the four mobile telephones 2A, 2B, 2C and 2D, and the hands free-system 10. In the X-Y coordinate system, the coordinates of a point "e" represent the positional coordinates of the hands-free system 10, the coordinates of a point "a" represent the positional coordinates of the mobile telephone 2A, the coordinates of a point "b" represent the positional coordinates of the mobile telephone 2B, the coordinates of a point "c" represent the positional coordinates of the mobile telephone 2C, and the coordinates of a point "d" represent the positional coordinates of the mobile telephone 2D. When the vehicle 100 is started, the hands-free system 10 works. The processing circuit 13 reads the positional coordinates of the hands-free system 10 under the control of the MCU 11, and outputs the positional coordinates to the MCU 11. In addition, the short-range communication units 22 of the mobile telephones 2A, 2B, 2C and 2D search for a hands-free system 10, and when the hands-free system 10 is found, establish a wireless connections for data transfers with the short-range communication unit 12 of the hands-free system 10. The processing circuits 23 read the positional coordinates of the mobile telephones 2A, 2B, 2C and 2D under the control of the control units 21, and output the respective positional coordinates of the mobile telephones 2A, 2B, 2C and 2D to the MCU 11 via the control units 21, the short-range communication units 22 and 12. The MCU 11 determines that it is the mobile telephone 2A which is located at the driving seat, via a comparison of the positional coordinates of the mobile telephones 2A, 2B, 2C and 2D and hands-free system 10.

A linear distance between the driving seat and the hands-free system 10 and a range of allowable error are stored in the MCU 11. The range of allowable error may be from 0 centimeters to 10 centimeters. The MCU 11 analyzes the positional coordinates of the mobile telephones 2A, 2B, 2C and 2D with the positional coordinates of the hands-free system 10, respectively compares the abscissas of the mobile telephones 2A, 2B, 2C and 2D with the abscissa of the hands-free system 10, and further compares the respective linear distances between the mobile telephones 2A, 2B, 2C and 2D and the hands-free system 10 with the stored linear distance, to determine which mobile telephone if any among all the mobile telephones 2A, 2B, 2C and 2D is located over the driving seat. The respective linear distances between the mobile telephone 2A, 2B, 2C and 2D and the hands-free system 10 are defined as $L_1$, $L_2$, $L_3$ and $L_4$. The mobile telephone 2 located in the driving seat satisfies the following conditions: first, the ordinate of the positional coordinates (ordinate) of the mobile telephone 2 is less than the ordinate of the hands-free system 10; second, the abscissa of the positional coordinates (abscissa) of the mobile telephone 2 is less than the abscissa of the hands-free system 10; third, any difference between the linear distance $L_1$ and the pre-stored linear distance is within the range of allowable error.

In detail, firstly, the MCU 11 compares the coordinates of the points "a", "b", "c" and "d" to the coordinates of the point "e", and the result of a first comparison shows that the coordinates of the points "a", "b", "c" and "d" are less than the coordinates of the point "e". Secondly, the MCU 11 compares the respective abscissas of the points "a", "b", "c" and "d" to the abscissa of the point "e", and the result of a second comparison shows that the abscissas of points "a" and "c" are less than the abscissa of the point "e". Thirdly, the linear distances $L_1$, $L_2$, $L_3$ and $L_4$ are calculated by the MCU 11. The MCU 11 acquires values for the respective differences between the linear distances $L_1$, $L_2$, $L_3$, $L_4$ and the pre-stored linear distance, and further acquires the values for the respective differences between the linear distances $L_1$, $L_2$ and the stored linear distance in relation to the range of allowable error. Accordingly, the MCU 11 determines that the mobile telephone 2A, represented by the point "a", is located in or on the driving seat according to the above calculations. Therefore, the MCU 11 controls the short-range communication unit 12 to connect with the short-range communication unit 22 of the telephone 2A for data transfers, and to turn on the hands-free function of the mobile telephone 2A.

When the driver needs to answer a call for example, the driver can touch a mark displayed by the input interface 15 to answer the call. Sound is inputted to the caller via the microphone 14. The voice of the caller is outputted into the vehicle 100 via the electro-acoustic component 16. In this way, the hands-free system 10 allows a hands-free operation of the mobile telephone 2A.

Figure 4:
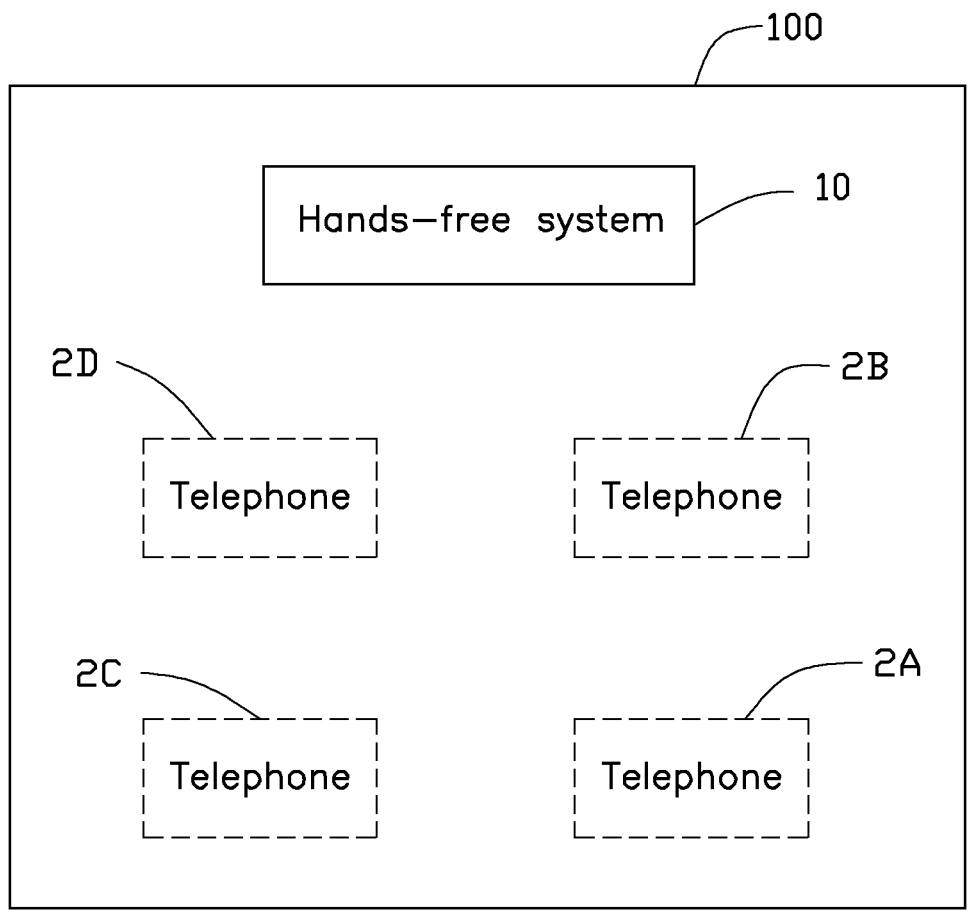
FIG. 4 is another diagram of the positional relationship applied to the four telephones 2A, 2B, 2C and 2D and the hands-free system in the vehicle, with the positions of the telephone 2A and telephone 2D of FIG. 2 changed.

FIG. 4 is a diagram of the positional relationship of the four mobile telephones 2A, 2B, 2C and 2D and the hands-free system 10 in the vehicle 100, with the positions of the mobile telephones 2A and 2D of FIG. 2 changed. The hands-free system 10 determines that the mobile telephone 2D is located in or on the driving seat based on the respective positional coordinates of the mobile telephones 2A, 2B, 2C and 2D compared to those of the hands-free system 10. Accordingly, the MCU 11 disconnects the mobile telephone 2A from the hands-free system 10, and establishes a wireless connection between the mobile telephone 2D and the hands-free system 10. The hands-free function of the mobile telephone 2A is turned off, and the hands-free function of the mobile telephone 2D is turned on.

The hands-free system 10 constantly compares the respective positional coordinates of the mobile telephones 2A, 2B, 2C and 2D with those of the hands-free system 10. Accordingly, the hands-free system 10 is immediately aware of a different telephone at the drivering seat, and automatically creates a wireless connection with the substitute telephone. When the engine of the vehicle 100 is stopped, the hands-free system 10 stops working, and any wireless connection between any of the mobile telephones 2A, 2B, 2C and 2D and the hands-free system 10 is automatically broken.

The hands-free system 10 provides great convenience for the driver wanting to use his mobile telephone without any manual operation.

Furthermore, since the mobile telephone 2 includes the short-range communication unit 22 and the processing circuit 23, the processing circuit 23 reads the positional coordinates of the mobile telephone 2, the short-range communication unit 22 automatically searches for the hands-free system 10, and when a hands-free system 10 is found, the short-range communication unit 22 can automatically be connected to the hands-free system 10 without any manual effort. Therefore, it is very convenient for the driver to use his mobile telephone 2.

In alternative embodiments, referring to FIG. 3, the MCU 11 also determines which mobile telephone among all the mobile telephones 2A, 2B, 2C and 2D is located on or in the driving seat using other calculations. In detail, a range of values may be, for example, from 0 centimeters to 10 centimeters and is stored in the MCU 11. The values of any difference between the respective ordinates of the points "a", "b", "c", "d" and the point "e" are calculated by the MCU 11. A mobile telephone which is located on or in the driving seat satisfies the following conditions: first, the ordinate of the mobile telephone is less than that of the hands-free system 10; second, the abscissa of the mobile telephone is less than that of the hands-free system 10; third, the value of any difference between the ordinate of the mobile telephone 2 and that of the hands-free system 10 is within the range of allowable values. Accordingly, the MCU 11 may determine that it is one particular mobile telephone which is located in or on the drivering seat.

When the driving seat of the vehicle 100 is located on the front right of the vehicle 100, the calculation methods of the MCU 11 may still be applied mutatis mutandis.

The mobile telephone 2 also can transmit the positional coordinates of itself to the hands-free system 10 at certain time intervals, via appropriate software programs, or hardware components, or firmware, of the mobile telephone 2.

It is believed that the present embodiments and their advantages will be understood from the foregoing description, and it will be apparent that various changes may be made thereto without departing from the spirit and scope of the embodiments or sacrificing all of their material advantages.

What is claimed is:

1. A vehicle comprising a hands-free system, the hands-free system comprising:
   a processing circuit calculating positional coordinates of the hands-free system;
   a short-range communication unit electrically coupled with a mobile telephone and receive positional coordinates of the mobile telephone; and
   a microcontroller unit receiving the positional coordinates of the hands-free system and the mobile telephone, analyzing positional coordinates of the mobile telephone in relation to positional coordinates of the hands-free system, determining whether the mobile telephone is located at a defined position of the vehicle, and establishing a data connection with the mobile telephone that is located at the defined position;
   wherein when the defined position is a range of where a driver's seat is placed in the vehicle; a linear distance between the driver's seat and the hands-free system and a range of allowable error are stored in the microcontroller unit; the microcontroller unit comparing an ordinate of the mobile telephone with an ordinate of the hands-free system, comparing an abscissa of the mobile telephone with an abscissa of the hands-free system, comparing linear distances between the mobile telephone and the hands-free system with the stored linear distance, and determining whether the mobile telephone is located at the defined position based on the comparison of the ordinate of the mobile telephone with the ordinate of the hands-free system, the comparison of the abscissa of the mobile telephone with the abscissa of the hands-free system, and the comparison of the linear distances between the mobile telephone and the hands-free system with the stored linear distance.

2. The vehicle of claim 1, wherein the processing circuit comprises a global positioning system receive.

3. The vehicle of claim 1, wherein the defined position is a range of where a driver's seat is placed in the vehicle.

4. The vehicle of claim 1, wherein when the microcontroller unit determines that the mobile telephone is not located at the defined position, the microcontroller unit does not establish the connection for data transfers with the mobile telephone.

5. The vehicle of claim 1, wherein the hands-free system establishes the data connection with the mobile telephone via the short-range communication unit.

6. A vehicle comprising a hands-free system, the hands-free system comprising:
   a processing circuit calculates positional coordinating of the hands-free system;
   a short-range communication unit electrically coupled with a mobile telephone and receive positional coordinates of the mobile telephone; and
   a microcontroller unit receiving the positional coordinates of the hands-free system and the mobile telephone, analyzing positional coordinates of the mobile telephone in relation to positional coordinates of the hands-free system, determining whether the mobile telephone is located at a defined position of the vehicle, and establish a data connection with the mobile telephone that is located at the defined position;
   wherein when the defined position is a range of where a driver's seat is placed in the vehicle; a range of values is stored in the microcontroller unit; the microcontroller unit calculating absolute difference values between the ordinate of the mobile telephone and the ordinate of the hands-free system, comparing an ordinate of the mobile telephone with an ordinate of the hands-free system, comparing an abscissa of the mobile telephone with an abscissa of the hands-free system, comparing the absolute difference values between the ordinates of the mobile telephone and the hands-free system with the stored range of values, and determining whether the mobile telephone is located at the defined position based on the comparison of the ordinate of the mobile telephone with the ordinate of the hands-free system, the comparison of the abscissa of the mobile telephone with the abscissa of the hands-free system, and the comparison of the absolute difference values between the ordinates of the mobile telephone and the hands-free system with the stored range of values.

7. The vehicle of claim 6, wherein the processing circuit comprises a global positioning system receive.

8. The vehicle of claim 6, wherein the defined position is a range of where a driver's seat is placed in the vehicle.

9. The vehicle of claim 6, wherein when the microcontroller unit determines that the mobile telephone is not located at the defined position, the microcontroller unit does not establish the connection for data transfers with the mobile telephone.

10. The vehicle of claim 6, wherein the hands-free system establishes the data connection with the mobile telephone via the short-range communication unit.

* * * * *